(12) United States Patent
Gumm

(10) Patent No.: US 10,482,477 B2
(45) Date of Patent: Nov. 19, 2019

(54) STRATIFIED SAMPLING APPLIED TO A/B TESTS

(71) Applicant: Netflix, Inc., Los Gatos, CA (US)

(72) Inventor: Bryan Jacob Gumm, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 628 days.

(21) Appl. No.: 13/841,149

(22) Filed: Mar. 15, 2013

(65) Prior Publication Data

US 2014/0278747 A1    Sep. 18, 2014

(51) Int. Cl.
*G06Q 30/02*    (2012.01)

(52) U.S. Cl.
CPC ................. *G06Q 30/0201* (2013.01)

(58) Field of Classification Search
CPC ...................................... G06Q 30/02
USPC ....................................... 705/7.29
See application file for complete search history.

(56) References Cited

U.S. PATENT DOCUMENTS

| | | | |
|---|---|---|---|
| 7,975,000 B2 | 7/2011 | Dixon et al. | |
| 8,160,909 B2* | 4/2012 | Voda et al. | ............. 705/7.11 |
| 8,296,643 B1* | 10/2012 | Vasilik | ............. 715/200 |
| 8,689,117 B1* | 4/2014 | Vasilik et al. | .......... 715/760 |
| 8,732,017 B2* | 5/2014 | Attenberg et al. | .......... 705/14.6 |
| 8,764,561 B1* | 7/2014 | Lan | ............. A63F 13/12 463/31 |
| 2007/0124192 A1* | 5/2007 | Moatti | ............. G06Q 30/02 705/7.29 |
| 2008/0162699 A1* | 7/2008 | Gaffney | ............. H04L 67/02 709/226 |
| 2009/0282343 A1* | 11/2009 | Catlin | ............. G06F 17/30867 715/738 |
| 2010/0205551 A1* | 8/2010 | Underwood | ......... G06F 17/3089 715/760 |
| 2010/0313183 A1* | 12/2010 | Ellen | ............. G06Q 30/02 717/110 |
| 2011/0320424 A1* | 12/2011 | Zias | ............. G06F 17/30867 707/708 |
| 2011/0320447 A1* | 12/2011 | Chen et al. | ............. 707/737 |
| 2012/0095834 A1* | 4/2012 | Doig et al. | ............. 705/14.53 |

(Continued)

FOREIGN PATENT DOCUMENTS

EP    2145259 A2    1/2010

OTHER PUBLICATIONS

Kohavi et al., "Controlled experiments on the web: survey and practical guide", Jul. 30, 2008, Published online by Springer Science+Business Media, LLC.

(Continued)

*Primary Examiner* — Kurtis Gills
(74) *Attorney, Agent, or Firm* — Artegis Law Group, LLP

(57) ABSTRACT

Embodiments provide techniques for testing a plurality of variations of a user experience, where each of the plurality of variations is distinct from other variations in the plurality of variations. For each permutation of a plurality of stratification factors that characterize users of the online site, embodiments generate a respective set of pseudorandom numbers. Additionally, user requests are assigned to variations in the plurality of variations, based on the generated sets of pseudorandom numbers. Embodiments also track user retention information relating to the user requests. At least one of the plurality of variations is rated, based on the user retention information.

26 Claims, 8 Drawing Sheets

(56) References Cited

U.S. PATENT DOCUMENTS

2013/0282510 A1* 10/2013 Swamy .................. G06Q 30/02
                                                    705/26.4
2013/0332386 A1* 12/2013 Billmaier et al. ............ 705/347
2014/0278747 A1*  9/2014 Gumm ........................ 705/7.29

OTHER PUBLICATIONS

Kohavi et al., "Online Experimentation at Microsoft", Third Workshop on Data Mining Case Studies and Practice Prize, Sep. 2009, Microsoft, Redmond, WA.

Ozolins, Matt, "Run More Tests, Run the Right Tests", Webics—Search Engine Marketing, Aug. 27, 2012, Published online.

Chopra, Paras, "How WriteWork.com increases sales by 50% & doubled conversions by A/B testing a radical new design", Visual Website Optimizer, Feb. 22, 2011, Published online.

sitespect.com, "The Web's Most Visited City Travel Site Wins Big by Optimizing Conversion Rates Through Automated Multivariate Testing", Sitespect Case Study, 2011, Published online (http://www.sitespect.com/resources/sitespect-vegas-case-study.pdf).

Christian, Brian, "The A/B Test: Inside the Technology That's Changing the Rules of Business", Wired.com, Apr. 25, 2012, Published online.

Granqvist, Hans, "'More like This . . . ' Building a network of similarity", The Netflix Tech Blog, Apr. 18, 2011, Published online.

* cited by examiner

700

| SIGNUP DEVICE | RETENTION | SUBSCRIBER % OF TOTAL |
|---|---|---|
| OTHER DEVICE | 1.11R% | A% |
| WII | 1.08R% | B% |
| PC/MAC | R% | C% |
| PS3 | 0.97R% | D% |
| TOTAL | R% | 100% |

| SIGNUP CHANNEL | RETENTION | SUBSCRIBER % OF TOTAL |
|---|---|---|
| REJOIN | 1.05R% | A% |
| NETFLIX READY DEVICES | 1.03R% | B% |
| ALL OTHER | 1.03R% | C% |
| ONLINE | 0.99R% | D% |
| WALK ON | 0.97R% | E% |
| MAIL AND INSERTS | 0.71R% | F% |
| AFFILIATES | 0.71R% | G% |
| TOTAL | R% | 100% |

FIG. 7B

STRATIFIED SAMPLING APPLIED TO A/B TESTS

BACKGROUND OF THE INVENTION

Field of Invention

Embodiments of the present invention generally relate to A/B testing, and more specifically to techniques for improving the results of an A/B test through the use of stratified sampling.

Description of Related Art

Web pages on modern websites, such as websites available on the Internet, are powerful communication tools for disseminating information regarding current events, organizations, and other items of interest to website visitors. Web pages can also provide targeted advertising of products and services. The content of web pages used to convey this information and deliver these advertisements varies considerably. Selections regarding style, graphics, and layout impact visitors' responses to the information offered on the web page, and seemingly small changes in web page appearance can sometimes dramatically change the effect of the web page on visitors. Certain websites generate revenue by way of a subscription model, in which customers periodically pay a fee to renew their subscription to the website. In such a website, selections regarding the style, graphics, and layout of the website, as well as selections of algorithms used by the website, can affect visitors' decisions with respect to their subscriptions or potential subscriptions.

The effectiveness of differing combinations of web page content can be gauged by measuring visitor responses to varying web page content. Through experimentation, effective website content can be identified. One technique for evaluating various website content is through the use of multivariate testing (also referred to as "split testing" and "A/B testing"). Generally, in online multivariate testing, different variations of a user experience on a website are tested by presenting each user experience to a respective group of users when the users access the website. For instance, a user experience could be a layout of content on the online website, where each variation represents a distinct arrangement of the content. As another example, a user experience could be a content selection algorithm that is used to select content that is included on a webpage of the website. As yet another example, the user experience could include an online advertisement, a graphic or more generally any component of a webpage that has one or more attributes (e.g., color, size, shape, location, text, etc.,) that can be varied. The different variations could then be presented to users, and the users' actions could be tracked (e.g., using user subscription information such as a login ID, using user IDs generated from the users' browser attributes and possibly other user device attributes, etc.). The captured actions may be used to determine the effectiveness of different variations of the user experience.

SUMMARY OF THE INVENTION

One embodiment provides a method for testing a plurality of variations of a user experience. Here, each of the plurality of variations is distinct from other variations in the plurality of variations. The method includes, for each permutation of a plurality of stratification factor values for one or more stratification factors that characterize users of the online site, generating a respective set of pseudorandom characters. Additionally, the method includes assigning user requests to variations in the plurality of variations, based on the generated sets of pseudorandom characters. The method also includes tracking user retention information relating to the user requests. The method further includes rating at least one of the plurality of variations, based on the user retention information.

Other embodiments include, without limitation, a computer-readable medium that includes instructions that enable a processing unit to implement one or more aspects of the disclosed methods as well as a system configured to implement one or more aspects of the disclosed methods.

Another embodiment provides a method of testing a plurality of variations of a user experience. Here, each of the plurality of variations is distinct from other variations in the plurality of variations. The method includes, for each of a plurality of user requests, determining a stratification factor value, from a plurality of stratification factor values, that is associated with the respective user request, and assigning the respective user request to one of the plurality of variations, based on the determined stratification factor value. Additionally, the method includes monitoring users interacting with assigned variations of the plurality of variations to collect user metric information. The method also includes evaluating each of the variations in the plurality of variations, with respect to each of the plurality of stratification factor values.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-B are screenshots illustrating the results of multivariate testing using stratified sampling, according to one embodiment described herein.

DETAILED DESCRIPTION

Figure 1:
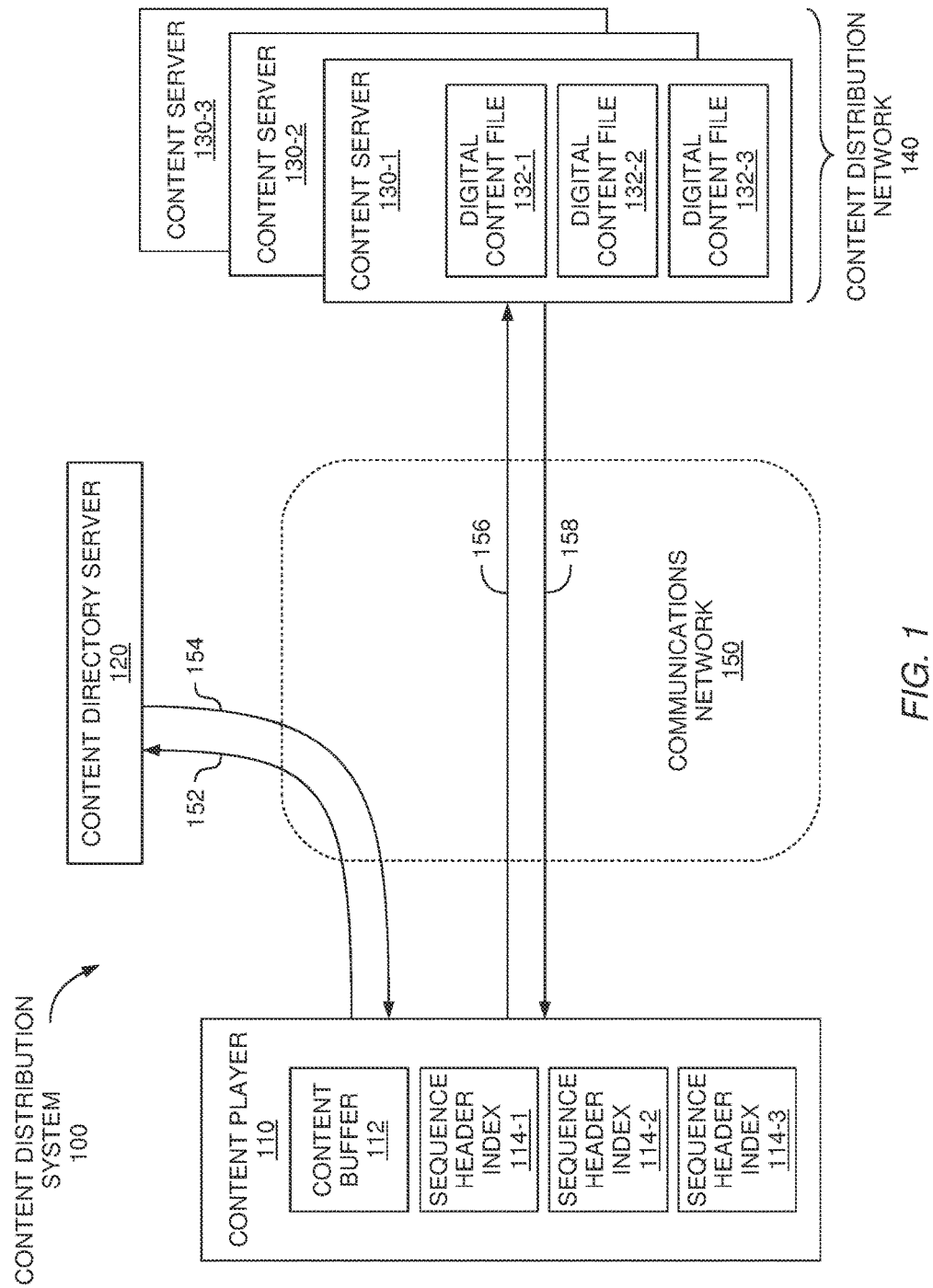
FIG. 1 illustrates a computing infrastructure configured to implement a streaming content service, according to one embodiment described herein.

Generally, multivariate testing for a website involves randomly assigning different variations of a user experience on the website to users, and tracking the users' behavior in order to evaluate the different variations relative to each other. For instance, the variations of the user experience may be assigned to users of the website randomly, in order to ensure that the variations are allocated evenly across all the users in the experimental group. As an example, a user ID associated with a particular user could be used for randomly assigning variations of the user experience to the users. For example, a user ID could be determined for a particular user (e.g., based on the user's login name for the website, based on attributes of the user's browser, etc.) and the user ID could be used to select a variation of the user experience to present to the user. For instance, a hash function could be applied to the user ID and used to select one of a plurality of different variations to present to the user.

The users' behavior could then be monitored and used to evaluate the different variations of the user experience, relative to one another. For instance, some multivariate testing models track user metrics such as a total number of mouse clicks while visiting the website, a measure of average clicks-per-second, a length of time the user visits the website, and so on. These metrics could then be used to evaluate the different variations. For example, in one model, a higher number of total mouse clicks could be viewed as a positive result, as such a result may indicate that the user is more engaged with the website. The different variations of the user experience could then be evaluated using the collected metric data. For instance, if a first one of the variations resulted in a higher number of total mouse clicks while a second one of the variations resulted in a smaller number of total mouse clicks, the first variation could be considered an improvement over the second variation of the user experience.

As with other forms of statistical analysis, the results of a multivariate test involve explaining the variance in the metric data for the different variations of the user experience. Generally speaking, the total variance consists of variance caused by the test experience, variance due to differences in strata and miscellaneous other forms of variance. One challenge in performing a multivariate test is to ascertain the variance caused by the test experience, while minimizing or eliminating other forms of variance in the results. That is, by attempting to isolate the variance caused by the test experience, the test facilitator can more accurately ascertain which of the variations in the user experience was best received by the users.

As an example, assume that a multivariate test is performed using two different variations of a user experience, and that users assigned to the first variation had a higher number of total mouse clicks, relative to the users assigned to the second variation. While generally speaking a higher number of total mouse clicks could indicate that the first variation was better received by users than the second variation, this is not necessarily the case. For instance, assume that users of a certain age group are generally more likely to have a higher number of total mouse clicks, regardless of which variation they are presented with. If substantially more users in the certain age group were assigned to the first variation than the second variation, the abundance of these users could have caused the first variation to receive the higher number of total mouse clicks, rather than the merit of the first variation itself. While techniques exist to estimate the amount of additional variance in the test results, the test results can be said to be less accurate and less meaningful with a higher amount of additional variance.

As such, embodiments provide techniques for reducing the amount of additional variance within the test results of a multivariate test for a plurality of variations of a user experience. A number of stratifications factors could be identified. Generally, the stratification factors represent user characteristics that may influence a metric of the multivariate test. As an example, an age range of users could be a stratification factor, if in a multivariate test measuring a user's total number of mouse clicks, the test provider determines that the age of the user generally influences the user's total number of mouse clicks. As another example, in a multivariate test measuring the retention rate of users for a subscription-based online site, the test provider could determine that the type of client device on which users signed up for their subscription influences the retention rates of the users. As such, the type of client device the users used to subscribe to the online site could be used as a stratification factor in multivariate testing on the online site.

For each permutation of one or more stratification factors that characterize users of the online site, embodiments could generate a respective set of pseudorandom numbers. Embodiments could then assign user requests to variations in the plurality of variations, based on the generated sets of pseudorandom numbers. Embodiments could also track user retention information relating to the user requests, and could use the retention information together with the stratification factors and information about the users to evaluate the plurality of variations. For instance, embodiments could ensure that each of the variations being evaluated is assigned an equal number of users across each permutation of the one or more stratification factors. Advantageously, doing so allows embodiments to minimize variance in the multivariate test results that is not attributable to the test multivariate itself, thereby providing a more accurate and power statistical model for evaluating the different variations.

Section I below describes one example of a subscription-based online site in which embodiments described herein can function. Of course, such an exemplary subscription-based online site is provided for illustrative purposes only, and more generally embodiments can be configured to operate in any environment appropriate for multivariate testing. These techniques for improved multivariate testing through the use of stratified sampling are discussed in more detail in Section II below.

I. Content Streaming Environment

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network. A network connection may broadly refer to a communications channel between two devices that are connected to the communications network 150.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110 (e.g., through one or more network connections). Multiple content servers 130 (e.g., content server 130-1, content server 130-2, content server 130-3, etc.) may each have a copy of the digital content file 132 and may each be configured to provide the portions of the file simultaneously to the same content player 110 using the communications network 150.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (e.g., a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2, and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence. Given that multiple content servers 130 (e.g., content server 130-1, content server 130-2, content server 130-3, etc.) may each have a copy of the digital content file 132, each of the multiple content servers 130 may therefore have the digital content file 132-1, digital content file 132-2, and digital content file 132-3, etc.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, while the digital content file 132-1 has an average playback bit rate of approximately 250 kilobits per second (Kbps), one time slot within the digital content file 132-1 could include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

Although, in the above description, the content distribution system 100 is shown with one content player 110 and one CDN 140, persons skilled in the art will recognize that the architecture of FIG. 1 contemplates only an exemplary embodiment of the invention. Other embodiments may include any number of content players 110 and/or CDNs 140. Thus, FIG. 1 is in no way intended to limit the scope of the present invention in any way.

Generally, the content player 110 (or an application executing on the content player 110) may be configured to determine a mapping of the plurality of content servers to a plurality of portions of the content buffer 112, based on network performance information characterizing the streaming performance of the plurality of content servers $130_{1-3}$ (e.g., based on previous digital content streams between the content player and the content servers $130_{1-3}$). For instance, the content player 110 could divide the content buffer 112 into the plurality of portions and, for each of the plurality of portions of the content buffer, could determining a size of the portion based on the retrieved network performance information for the corresponding content server. In one embodiment, the content buffer is divided into portions such that content servers $130_{1-3}$ having a slower network performance, as indicated by the network performance information, are mapped to later portions of the content buffer 112, and content servers with a faster network performance, as indicated by the network performance information, are mapped to earlier portions of the content buffer 112.

Additionally, the content player 110 may transmit a request to each of the plurality of content servers $130_{1-3}$ to transmit digital content associated with the corresponding portion of the content buffer (e.g., a portion of the digital content file 132-1. Doing so allows the content player 110 to stream digital content simultaneously from a plurality of different content servers $130_{1-3}$, which may maximize the network throughput of the streaming and improve the quality of the streaming content (e.g., by streaming a higher quality encoding of the digital content using the increased network throughput). Additionally, by mapping later portions of the content buffer to slower content servers and earlier portions of the content buffer to faster content servers, embodiments may effectively use a variety of different content servers.

Another embodiment provides techniques for optimizing a plurality of parallel network connections for a digital content stream through a network between a plurality of content servers and a content player. In such an embodiment, the content player 110 (or an application executing on the content player 110) may determine an indication of network performance for each of the plurality of parallel network connections. Additionally, the content player 110 could determine whether a first one the plurality of parallel network connections is underperforming, based on whether the indication of network performance associated with the first parallel network connection exceeds a threshold value of performance. Upon determining that the first parallel network connection is underperforming, the content player 110 could drop the first parallel network connection. Additionally, the content player could also be configured to add a new network connection to a content server under certain circumstances. For instance, in one embodiment, the content player 110 is configured to add a new network connection upon determining that a total network throughput is less than a threshold amount of throughput. Advantageously, doing so helps to optimize the number of parallel network connections used by the content player for streaming digital content.

Figure 2:
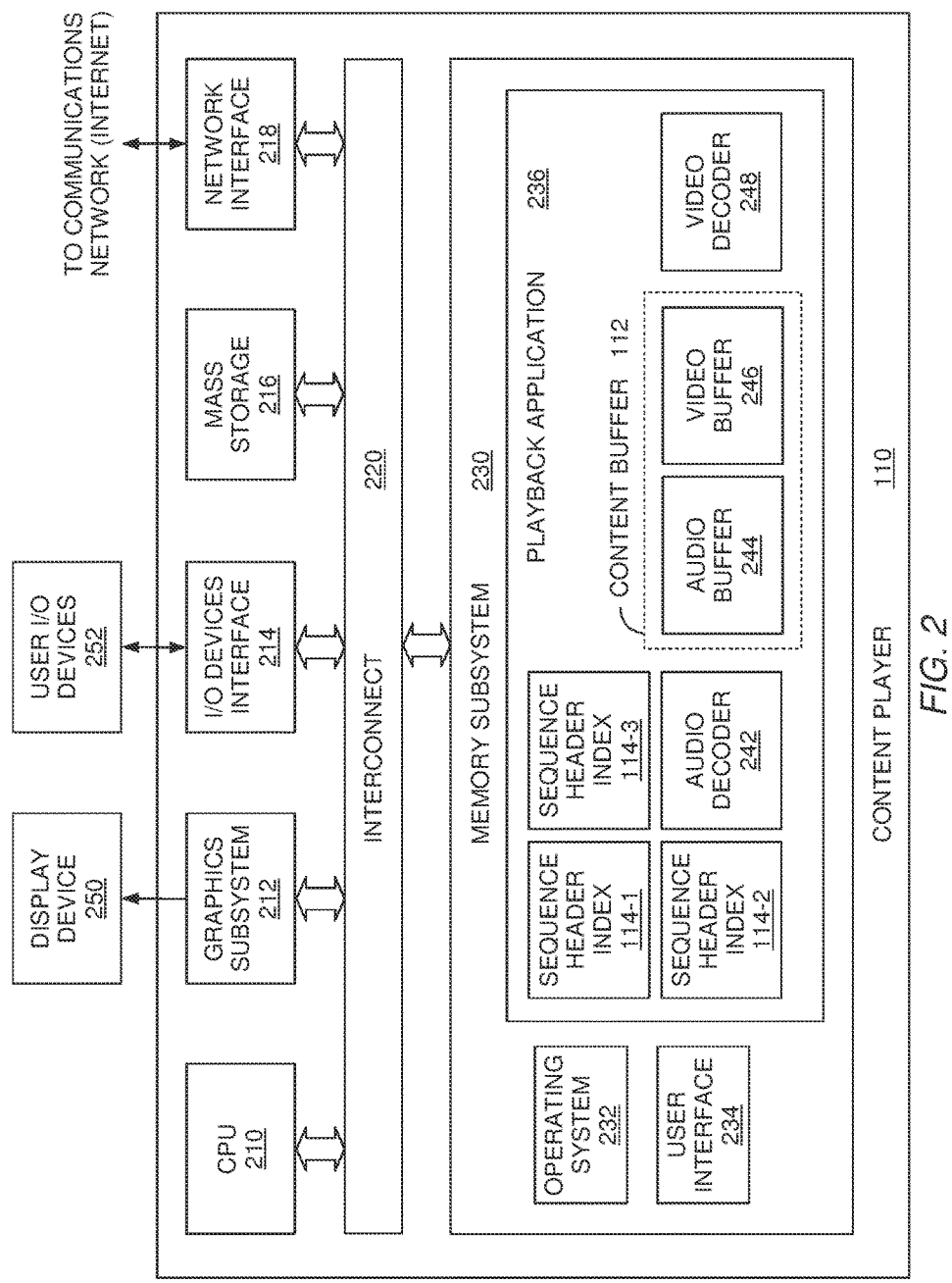
FIG. 2 illustrates a content player configured with a playback application, according to one embodiment described herein.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from one or more of the content servers 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130.

In one embodiment, the playback application 236 begins downloading the digital content file 132 associated with the requested title comprising the encoded sequence encoded to the lowest playback bit rate to minimize startup time for playback. For the purposes of discussion, the digital content file 132-1 is associated with the requested title and comprises the encoded sequence encoded to the lowest playback bit rate. The requested digital content file 132-1 is downloaded into the content buffer 112, configured to serve as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
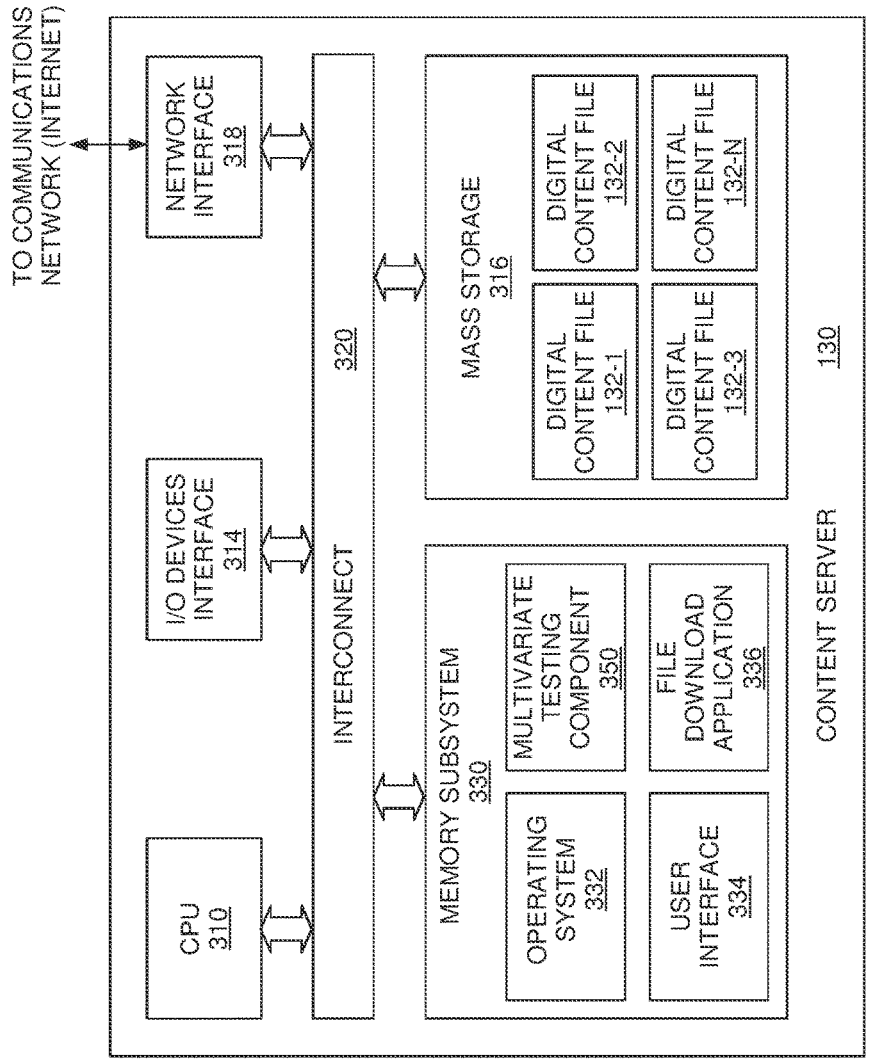
FIG. 3 illustrates a content server configured with a file download application, according to one embodiment described herein.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, a file download application 336 and a multivariate testing component 350. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130. Generally, the multivariate testing component 350 is configured to perform multivariate testing on different variations of a user experience on the content streaming system. These techniques for improved multivariate testing are discussed in more detail below in Section II.

The file download application 336 is configured to facilitate the transmission of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence. As described, each digital content file 132 includes a sequence header index 114 and an encoded sequence. An encoded sequence provides a full version of digital media content (e.g., video or audio data), encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

II. Multivariate Testing with Stratified Sampling

As discussed above, embodiments described herein provide techniques for testing a plurality of variations of a user experience, where each of the plurality of variations is distinct from other variations in the plurality of variations. Generally, a user experience represents any entity that can be evaluated through the use of multivariate testing. Examples of such a user experience include images, animations, audio, layouts, algorithms, and so on. For example, multivariate testing could be used to evaluate different variations of a company's logo on an online website. As another example, multivariate testing could be used to evaluate different content selection algorithms on an online content streaming site.

In some embodiments, multivariate testing can be used to evaluate multiple variations of multiple user experiences. An example of this is shown in FIGS. 4A-D, which illustrate different variations of a user experience, according to one embodiment described herein. In the examples shown in FIGS. 4A-D, two different user experiences are being evaluated: two different variations of a logo for an online site, and two different variations of a search algorithm for the online site.

Figure 4A:
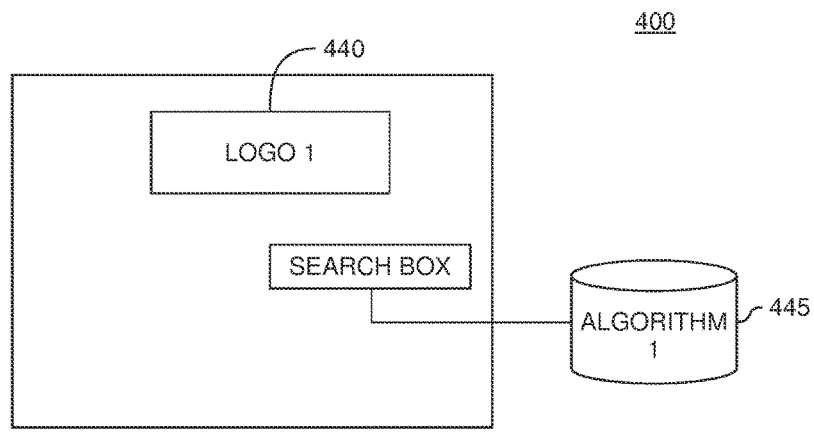
FIGS. 4A-D illustrate different variations of a user experience, according to one embodiment described herein.

As shown, the FIG. 4A is a screenshot of an interface 400 for an online site. The interface 400 includes a first logo 440 and a search box that is tied to a first search algorithm 445.

Figure 4B:
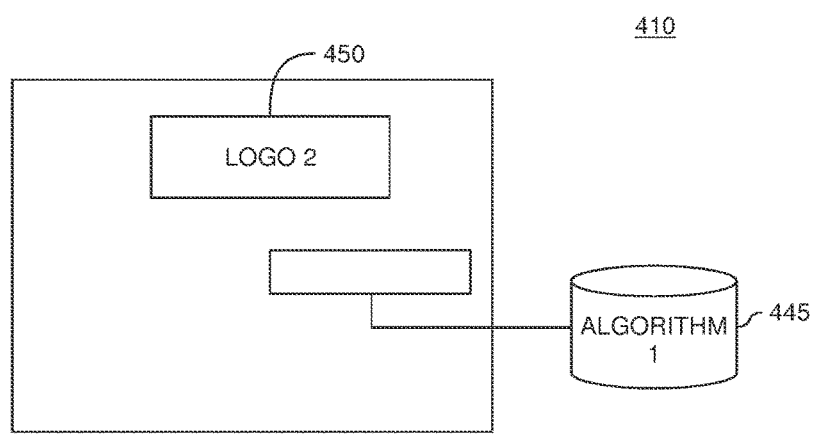
Figure 4C:
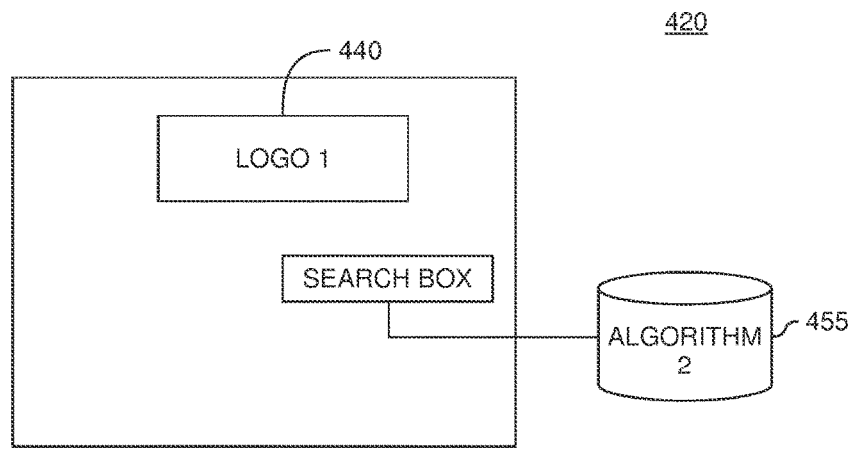
Figure 4D:
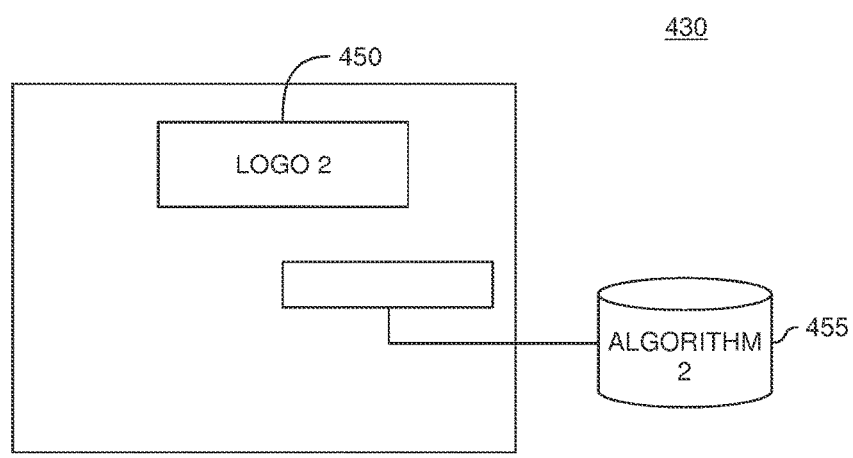

FIG. 4B illustrates a second variation of the online site. That is, the FIG. 4B illustrates an interface 410 that includes the search box that is tied to the first search algorithm, but also includes a second logo 450 for the online site. Similarly, in FIG. 4C, the interface 420 includes the first logo 440, but includes a search box tied to a second search algorithm 455. Finally, the FIG. 4D illustrates yet another variation, where the interface 430 includes the second logo 450 and the second search algorithm 455.

Generally, for a multivariate test involving the interfaces 400, 410, 420 and 430, users visiting the online site will be shown one of these different variations. For example, a particular user visiting the online site could be presented with the interface 400, while a different user could be presented with the interface 410. User information associated with the tested users could be monitored and then used to evaluate the different interfaces 400, 410, 420 and 430. For example, a particular multivariate test could track retention information for the users of a subscription-based online site (i.e., whether the users maintained their subscriptions at the end of the multivariate test), and the variation associated with the highest retention rate could be selected as the best variation for the online site.

However, as discussed above, such multivariate testing may be improved by reducing an amount of non-test related variance in the test results. As such, embodiments provide techniques for improved multivariate testing through the use of stratified sampling. For instance, a multivariate testing component 350 could determine a number of stratification factors that characterize users to be tested, for use in stratifying the results of the multivariate test. Generally, it is preferable for the multivariate testing component 350 to use stratification factors that are likely to influence the metric being measured in the multivariate test (e.g., user retention rates). Examples of such stratification factors include, without limitation, a manner in which users subscribed to the online site, an age (or age range) of users, a type of client device the users use to connect to the online site, and so on.

For each permutation of a plurality of stratification factors that characterize users of the online site, the multivariate testing component 350 could generate a respective set of pseudorandom numbers. The multivariate testing component 350 may then use these sets of pseudorandom numbers to assign user requests to variations in the plurality of variations. For instance, the multivariate testing component 350 could determine that users may subscribe using one of six different types of devices, and thus could generate six different sets of pseudorandom numbers. Generally, each set of pseudorandom numbers could contain a number of distinct integers, equal to the number of different variations of the user experience being tested, where each of the distinct integers corresponds to a different one of the variations. For example, assume that three different logo images for the online site are being tested in the multivariate test. In such an example, the multivariate testing component 350 could generates the set of pseudorandom numbers using only the integers 1, 2, and 3, where the number 1 corresponds to a first variation, the number 2 corresponds to a second variation and the number 3 corresponds to a third variation being evaluated.

Additionally, the multivariate testing component 350 could generate each set of pseudorandom numbers by iteratively selecting one permutation of the determined integers, until all permutations have been used in the set of pseudorandom numbers, and then repeating this process until a predetermined length is reached. For example, starting with an empty set of pseudorandom numbers, the multivariate testing component 350 could determine that a first permutation of the integers 1, 2 and 3 is "1, 2, 3", and could insert this permutation into the set. The multivariate testing component 350 could then determine that "1, 3, 2" is a second distinct permutation of these numbers and could insert this permutation into the set. The multivariate testing component 350 could then repeat this process for the remaining permutations of "2, 1, 3", "2, 3, 1", "3, 1, 2" and "3, 2, 1". Once all the distinct permutations of the numbers have been inserted into the set of pseudorandom numbers, the multivariate testing component 350 could repeat this process until a predetermine size for the set of pseudorandom numbers is reached.

When the multivariate testing component 350 then receives a user request during the multivariate testing, the multivariate testing component 350 could determine stratification factor information for the user associated with the user request. For instance, in an embodiment where the multivariate testing component 350 is configured to stratify users based on their preferred type of client device, the multivariate testing component 350 could determine which type of client device is most frequently used by the user submitting the user request. For purposes of this example, assume that the multivariate testing component 350 determines that a personal computer is the preferred type of client device for the received user request.

The multivariate testing component 350 could then determine which of the generated sets of pseudorandom numbers corresponds to this type of client device (in this example, the personal computer), and could select the next number from the determined set of pseudorandom numbers. In one embodiment, the multivariate testing component 350 maintains a respective current position indicator for each of the sets of pseudorandom numbers. In such an embodiment, the multivariate testing component 350 could use the corresponding current position indicator as an index to select one of the numbers in the set of pseudorandom numbers, corresponding to users whose preferred type of client device is a personal computer. Once one of the numbers is selected, the multivariate testing component 350 could then update the current position indicator (e.g., by incrementing the current position indicator to correspond to the next number in the set of pseudorandom numbers).

Upon selecting one of the numbers from the corresponding set of pseudorandom numbers, the multivariate testing component 350 could determine which variation of the user experience being evaluated the selected number corresponds to. The multivariate testing component 350 could then present the determined variation to the user associated with the user request. Additionally, the multivariate testing component 350 could track user retention information relating to the user requests, and could rate the different variations of the user experience, based on the user retention information. For instance, the multivariate testing component 350 could calculate a separate retention rate for each variation being evaluated and for each distinct permutation of the one or more stratification factors. The multivariate testing component 350 could then display this information, for use in evaluating the different variations relative to one another. In other words, by applying stratified sampling techniques to the multivariate test, the multivariate testing component 350 enables comparisons between different variations, for groups of similarly situated users (e.g., comparisons of retention rates between users shown variation A and users shown variation B, for only those users who signed on to the online site using a particular client device). Advantageously, doing so helps to reduce additional variance in the test results, thereby providing a more accurate and powerful multivariate test.

Figure 5:
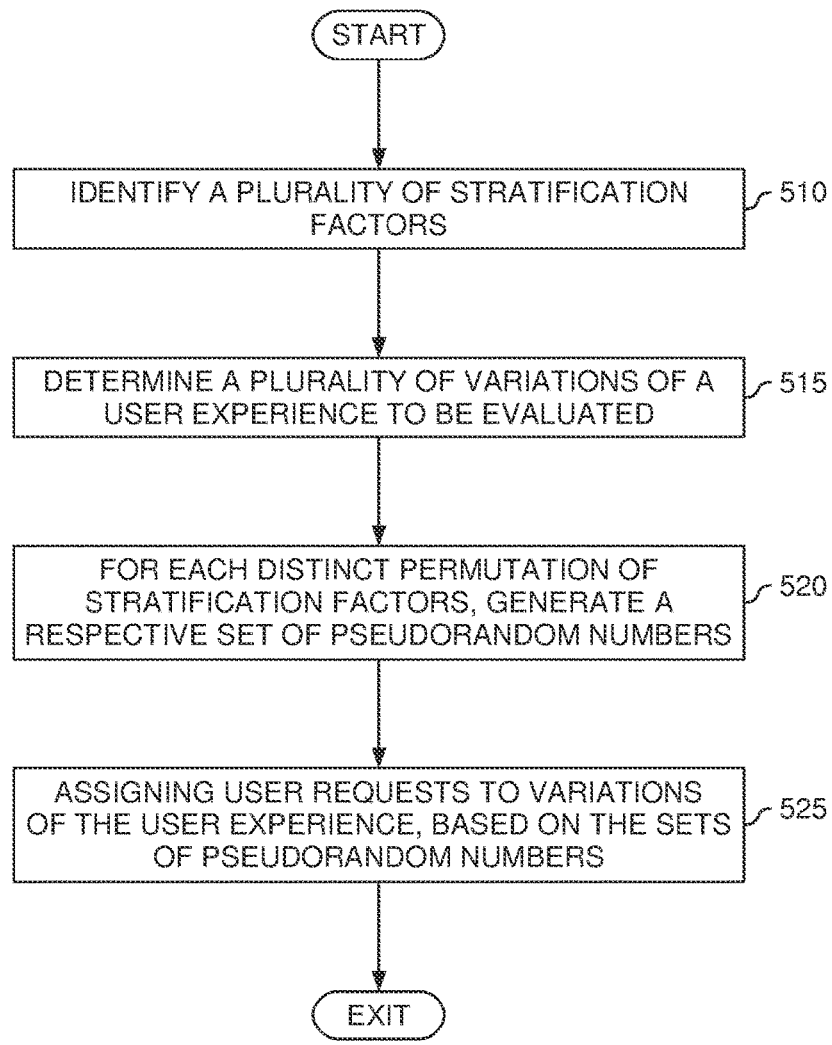
FIG. 5 is a flow diagram illustrating a method of assigning variations of a user experience for multivariate testing, according to one embodiment described herein.

FIG. 5 is a flow diagram illustrating a method of assigning variations of a user experience for multivariate testing, according to one embodiment described herein. As shown, the method 500 begins at block 510, where the multivariate testing component 350 identifies a plurality of stratification factors to use in stratifying the results of a multivariate test. Generally, it is preferable for the stratification factors to be factors determined to influence the metric being measured in the multivariate test. For example, if a particular multivariate test monitors user retention information to a subscription service and uses this retention information to evaluate different variations of a user experience, the stratification factors could be one or more factors whose values are determined to influence the users' retention rate. For instance, if younger users tend to have a lower retention rate than older users, the age (or an age range) of users being evaluated could be one of the stratification factors.

The multivariate testing component 350 then determines a plurality of variations of a user experience being evaluated (block 515). Generally, the variations may relate to a single element of the user experience (i.e., as in a traditional A/B or split testing scenario). For example, the variations could relate to different images used as a company's logo on a website. In one embodiment, the variations relate to multiple elements of the user experience (e.g., variations in the company's logo, as well as variations in a back-end content selection algorithm used by the site being evaluated).

The multivariate testing component 350 then generates, for each distinct permutation of stratification factor values, a separate set of pseudorandom numbers (block 520). As discussed above, each of the sets of pseudorandom numbers includes a respective number corresponding to each of the distinct variations being evaluated. For example, if four distinct variations are being evaluated (e.g., the variations shown in FIGS. 4A-D), the sets of pseudorandom numbers could contain the numbers 1, 2, 3 and 4, where each of these numbers corresponds to a respective one of the variations. Of note, while this example uses a number of distinct integers, such an example is for illustrative purposes only and is without limitation. More generally, the multivariate testing component 350 could use a pseudorandom set of distinct characters of any sort (e.g., alphabetic letters), where each of the characters corresponds to a respective one of the variations. To this end, it is broadly contemplated that any technique for ensuring an equal (or approximately equal) distribution of users from each strata are assigned to each of the variations can be used, consistent with the functionality described herein.

Once the sets of pseudorandom numbers are generated, the multivariate testing component 350 assigns user requests to variations of the user experience being evaluated, based on the sets of pseudorandom numbers (block 525), and the method 500 ends. As discussed above, in one embodiment, the multivariate testing component 350 maintains a separate position indicator for each of the sets of pseudorandom numbers. In such an embodiment, the multivariate testing component 350 could determine, for an incoming user request, which set of pseudorandom numbers corresponds to the user request. For instance, the multivariate testing component 350 could determine the stratification factor values for the user associated with the request, and could then determine the set of pseudorandom numbers associates with these stratification factor values. The multivariate testing component 350 could then use the corresponding current position indicator for the determined set of pseudorandom numbers as an index, in order to select one of the pseudorandom numbers in the set. The multivariate testing component 350 could then determine which of the variations of the user experience corresponds to the selected number, and could assign the user request to the determined experience. The multivariate testing component 350 could also update the current position indicator accordingly. Advantageously, doing so helps to ensure an equal distribution of users in each strata across all of the variations being evaluated.

Figure 6:
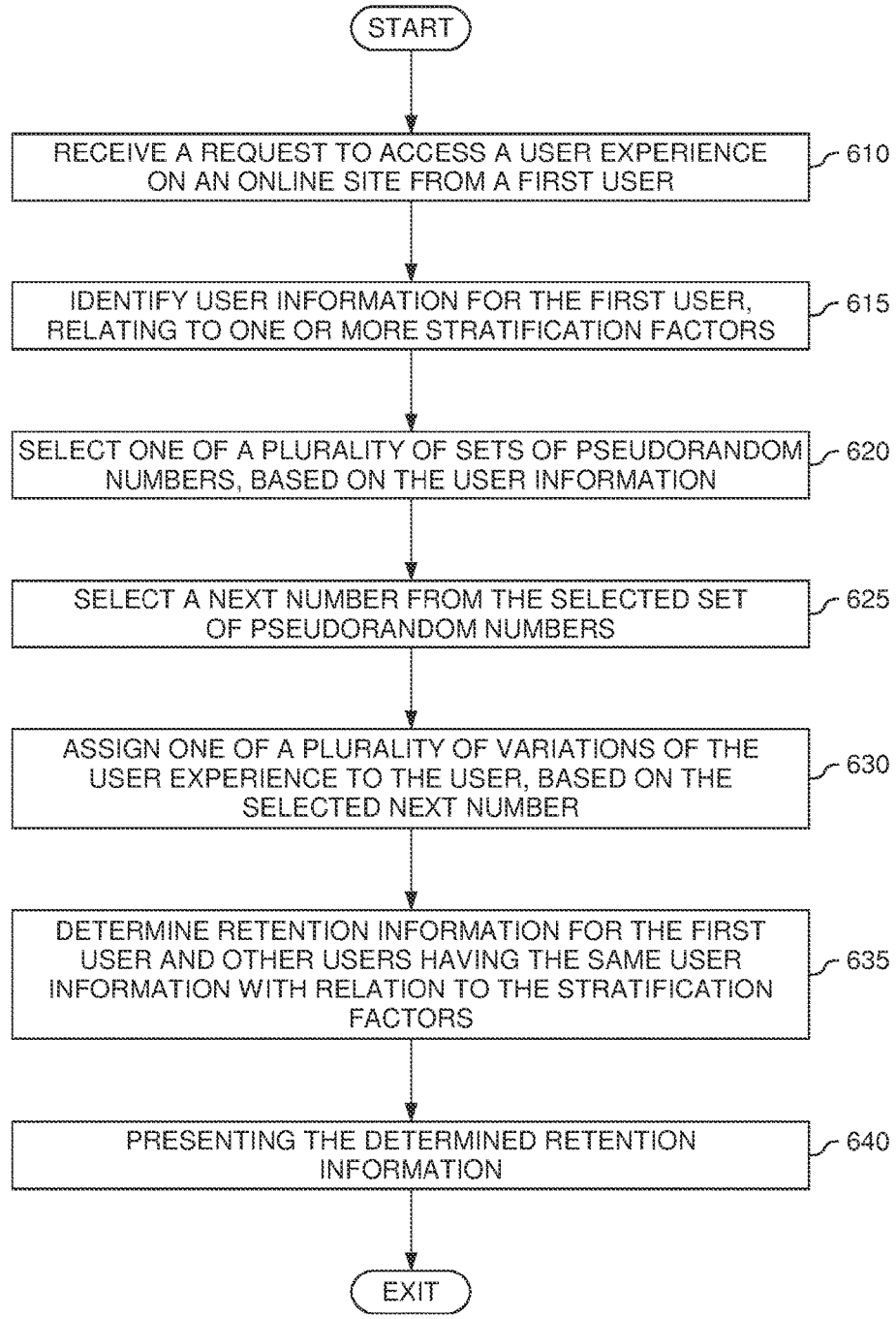
FIG. 6 is a flow diagram illustrating a method of performing a multivariate test using stratified sampling, according to one embodiment described herein.

FIG. 6 is a flow diagram illustrating a method of performing a multivariate test using stratified sampling, according to one embodiment described herein. As shown, the method 600 begins at block 610, where the multivariate testing component 350 receives a request to access a user experience on an online site from a first user. The multivariate testing component 350 then identifies user information for the first user relating to one or more stratification factors (block 615). For example, if a particular multivariate test is using the user's preferred type of client device as one stratification factor, the multivariate testing component 350 could determine which type of client device is preferred by the first user (e.g., based on a user profile associated with the first user).

The multivariate testing component 350 then selects one of the sets of pseudorandom numbers, based on the user information (block 620). As discussed above, each of the sets of pseudorandom numbers may correspond to a distinct permutation of stratification factor values, and thus the multivariate testing component 350 could select the set of pseudorandom numbers associated with the stratification factor values for the first user. The multivariate testing component 350 also selects a next number from the selected set of pseudorandom numbers (block 625).

As discussed above, the sets of pseudorandom numbers may consist of a plurality of distinct numbers (or more generally, distinct characters), where each of the distinct numbers corresponds to a respective one of the different variations being evaluated. Upon selecting the next number, the multivariate testing component 350 determines which of the plurality of variations corresponds to the selected number, and assigns the user request to the determined variation (block 630). The multivariate testing component 350 could then monitor the user's behavior while interacting with the determined variation (e.g., how many total mouse clicks the user made while viewing the determined variation).

In the depicted example, the multivariate testing component 350 then determines retention information for the first user and other users having the same stratification factor values (block 635). For example, the multivariate testing component 350 could be configured to run the multivariate test for a subscription-based online site for a predetermined length of time (e.g., 2 months), and once the predetermined length of time has elapsed, the multivariate testing component 350 could determine how many of the tested users are still subscribers to the subscription-based online site. Although the present example uses retention information for the users as a metric by which to evaluate the different variations of the user experience, it is broadly contemplated that any number of different metrics or combinations of metrics could be used. Examples of other such metrics include a total number of mouse clicks made by the user while interacting with the presented variation, a total length of time spent by the user interacting with the presented variation, and so on. The multivariate testing component 350 then presents the determined retention information (block 640), and the method 600 ends. Advantageously, by ensuring an equal (or approximately equal) distribution of users for each of the different strata are assigned to each variation being evaluated, embodiments provide a more accurate and powerful multivariate test.

FIGS. 7A-B are screenshots illustrating the results of multivariate testing using stratified sampling, according to one embodiment described herein. As shown, FIG. 7A is a screenshot 700 illustrating the results of a multivariate test with respect to a particular variation of a user experience. In the depicted screenshot, the users assigned to the particular variation have been divided up into different strata, based on the type of device the users used to subscribe to the subscription-based online site. Thus, in this example, although the average retention rate for users assigned to the particular variation was 68.8%, certain strata groups had a lower retention rate (i.e., users who signed up using a PS3 device) while other strata groups had a significantly higher retention rate (i.e., users who signed up with a Wii® device or another device).

As another example, FIG. 7B illustrates a screenshot 750 of the multivariate test, with respect to a particular variation and a signup channel stratification factor. Generally, the signup channel stratification factor represents a method through which the users signed up for the Netflix® service. In the depicted screenshot, users assigned to a particular variation have been divided up into different strata, based on the signup channel through which users signed up for the Netflix® service. Thus, in the depicted example, although the average retention rate for users assigned to the particular variation was 68.8%, certain strata groups exhibited a lower retention rate (i.e., users who signed up via post mail and inserts and users who signed up through an affiliate), while other strata groups exhibited a higher than average retention rate (i.e., users who re-subscribed to the Netflix® service, users who signed up using a Netflix®-ready device, etc.).

The multivariate testing component 350 could then generate similar interfaces for the other variations being evaluated, which could then be compared to the interface 700 to evaluate the results of the multivariate test. Advantageously, doing so allows the test administrator to compare the results for the different variations across different strata, thereby providing a more accurate and powerful multivariate test.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A method of testing a plurality of variations of a user experience on an online site, wherein each of the plurality of variations is distinct from other variations in the plurality of variations, comprising:

for each permutation of a plurality of stratification factor values for one or more stratification factors that characterize users of the online site, generating a respective plurality of pseudorandom characters, wherein each distinct character included in the plurality of pseudorandom characters represents a different variation included in the plurality of variations;

receiving, by a computing system over a network, a plurality of user requests for accessing the online site;

assigning the plurality of user requests to variations in the plurality of variations by computationally traversing a subset of the generated pluralities of pseudorandom characters associated with the plurality of user requests;

tracking, by operation of one or more computer processors, user retention information relating to the plurality of user requests;

calculating a retention rate for each variation included in the plurality of variations based on the user retention information; and selecting content of the online site based on a comparison between a first retention rate of a first variation and a second retention rate of a second variation, wherein the content is associated with the first variation or the second variation.

2. The method of claim 1, wherein each of the pluralities of pseudorandom characters comprises a respective plurality of integers, each containing integers from 1 to n, where n is a number of distinct variations in the plurality of variations.

3. The method of claim 1, wherein the one or more stratification factors include at least one of (i) a manner in which a user signed up for the online site, (ii) a type of client the user uses to connect to the online site, (iii) a type of subscription the user has with the online site, and (iv) metadata characterizing the user.

4. The method of claim 1, wherein assigning plurality of user requests to variations in the plurality of variations further comprises:

for each of the pluralities of pseudorandom characters, maintaining a current position indicator;

for a first one of the users requests, selecting a characters from a first one of the pluralities of pseudorandom characters, using the corresponding current position indicator as an index into the first plurality of pseudorandom characters, wherein the first user request is assigned one of the plurality of variations based on the selected character; and updating the corresponding current position indicator.

5. The method of claim 1, wherein one of the plurality of variations comprises, relative to the other variations in the plurality of variations, at least one of (i) a distinct interface element, (ii) a distinct interface arrangement, (iii) a distinct algorithm used by the online site.

6. The method of claim 1, further comprising:

calculating a respective retention rate for each of the plurality of variations, with respect to at least one of the plurality of stratification factors.

7. The method of claim 1, further comprising:

identifying a plurality of variables to evaluate; and generating the plurality of variations based on the plurality of variables, wherein each of the plurality of variations comprises a distinct permutation of the variables in the plurality of variables.

8. A non-transitory computer-readable medium containing a program that, when executed by one or more computer processors, performs an operation for testing a plurality of variations of a user experience, wherein each of the plurality of variations is distinct from other variations in the plurality of variations, the operation comprising:

for each permutation of a plurality of stratification factor values for one or more stratification factors that characterize users of an online site, generating a respective plurality of pseudorandom characters, wherein each distinct character included in the plurality of pseudorandom characters represents a different variation included in the plurality of variations;

receiving, by a computing system over a network, a plurality of user requests for accessing the online site;

assigning the plurality of user requests to variations in the plurality of variations by computationally traversing a subset of the generated pluralities of pseudorandom characters associated with the plurality of user requests;

tracking user retention information relating to the plurality of user requests;

calculating a retention rate for each variation included in the plurality of variations based on the user retention information; and selecting content of the online site based on a comparison between a first retention rate of a first variation and a second retention rate of a second variation, wherein the content is associated with the first variation or the second variation.

9. The non-transitory computer-readable medium of claim 8, wherein each of the pluralities of pseudorandom characters comprises a respective plurality of integers, each containing integers from 1 to n, where n is a number of distinct variations in the plurality of variations.

10. The non-transitory computer-readable medium of claim 8, wherein the one or more stratification factors include at least one of (i) a manner in which a user signed up for the online site, (ii) a type of client the user uses to connect to the online site, (iii) a type of subscription the user has with the online site, and (iv) metadata characterizing the user.

11. The non-transitory computer-readable medium of claim 8, wherein assigning plurality of user requests to variations in the plurality of variations further comprises:

for each of the pluralities of pseudorandom characters, maintaining a current position indicator;

for a first one of the users requests, selecting a characters from a first one of the pluralities of pseudorandom characters, using the corresponding current position indicator as an index into the first plurality of pseudorandom characters, wherein the first user request is assigned one of the plurality of variations based on the selected character; and updating the corresponding current position indicator.

12. The non-transitory computer-readable medium of claim 8, wherein one of the plurality of variations comprises, relative to the other variations in the plurality of variations, at least one of (i) a distinct interface element, (ii) a distinct interface arrangement, (iii) a distinct algorithm used by the online site.

13. The non-transitory computer-readable medium of claim 8, the operation further comprising:

calculating a respective retention rate for each of the plurality of variations, with respect to at least one of the plurality of stratification factors.

14. The non-transitory computer-readable medium of claim 8, the operation further comprising:

identifying a plurality of variables to evaluate; and generating the plurality of variations based on the plurality of variables, wherein each of the plurality of variations comprises a distinct permutation of the variables in the plurality of variables.

15. A system, comprising:

a processor; and a memory containing a program that, when executed by the processor, performs an operation for testing a plurality of variations of a user experience, wherein each of the plurality of variations is distinct from other variations in the plurality of variations, comprising:

for each permutation of a plurality of stratification factor values for one or more stratification factors that characterize users of an online site, generating a respective plurality of pseudorandom characters, wherein each distinct character included in the plurality of pseudorandom characters represents a different variation included in the plurality of variations;

receiving, by a computing system over a network, a plurality of user requests for accessing the online site;

assigning the plurality of user requests to variations in the plurality of variations by computationally traversing a subset of the generated pluralities of pseudorandom characters associated with the plurality of user requests;

tracking user retention information relating to the plurality of user requests;

calculating a retention rate for each variation included in the plurality of variations based on the user retention information; and selecting content for presentation on the online site based on a comparison between a first retention rate of a first variation and a second retention rate of a second variation, wherein the content is associated with the first variation or the second variation.

16. The system of claim 15, wherein each of the pluralities of pseudorandom characters comprises a respective plurality of integers, each containing integers from 1 to n, where n is a number of distinct variations in the plurality of variations.

17. The system of claim 15, wherein the one or more stratification factors include at least one of (i) a manner in which a user signed up for the online site, (ii) a type of client the user uses to connect to the online site, (iii) a type of subscription the user has with the online site, and (iv) metadata characterizing the user.

18. The system of claim 15, wherein assigning user requests to variations in the plurality of variations further comprises:

for each of the pluralities of pseudorandom characters, maintaining a current position indicator;

for a first one of the users requests, selecting a characters from a first one of the pluralities of pseudorandom characters, using the corresponding current position indicator as an index into the first plurality of pseudorandom characters, wherein the first user request is assigned one of the plurality of variations based on the selected character; and updating the corresponding current position indicator.

19. The system of claim 15, wherein one of the plurality of variations comprises, relative to the other variations in the plurality of variations, at least one of (i) a distinct interface element, (ii) a distinct interface arrangement, (iii) a distinct algorithm used by the online site.

20. The system of claim 15, the operation further comprising:
calculating a respective retention rate for each of the plurality of variations, with respect to at least one of the plurality of stratification factors.

21. The system of claim 15, the operation further comprising:
identifying a plurality of variables to evaluate; and
generating the plurality of variations based on the plurality of variables, wherein each of the plurality of variations comprises a distinct permutation of the variables in the plurality of variables.

22. A method of testing a plurality of variations of a user experience, wherein each of the plurality of variations is distinct from other variations in the plurality of variations, comprising:
for each of a plurality of user requests, received by a computing system over a network, for accessing an online site:
selecting a first set of pseudorandom characters in a plurality of sets of pseudorandom characters, wherein a different set of pseudorandom characters in the plurality of sets of pseudorandom characters has been generated for each permutation of the plurality of stratification factor values, and each distinct character included in the first set of pseudorandom characters represents a different variation included in the plurality of variations;
assigning the respective user request to a variation in the plurality of variations by computationally traversing the first set of pseudorandom characters associated with the respective user request;
monitoring users interacting with assigned variations of the plurality of variations to collect user metric information;
evaluating, by operation of one or more computer processors, each of the variations in the plurality of variations, with respect to each of the plurality of stratification factor values; and
calculating a retention rate for each of the variations in the plurality of variations; and
selecting content for presentation on the online site based on a comparison between a first retention rate of a first variation and a second retention rate of a second variation, wherein the content is associated with the first variation or the second variation.

23. The method of claim 1, wherein the retention rate indicates a rate at which at least a subset of the users of the online site maintained subscriptions to the online site.

24. The non-transitory computer-readable medium of claim 8, wherein the retention rate indicates a rate at which at least a subset of the users of the online site maintained subscriptions to the online site.

25. The system of claim 15, wherein the retention rate indicates a rate at which at least a subset of the users of the online site maintained subscriptions to the online site.

26. The method of claim 22, wherein the retention rate indicates a rate at which at least a subset of the users of the online site maintained subscriptions to the online site.

* * * * *